(12) United States Patent
Miyauchi et al.

(10) Patent No.: US 8,171,746 B2
(45) Date of Patent: May 8, 2012

(54) HUMIDITY CONTROL DEVICE

(75) Inventors: Hikoo Miyauchi, Tokyo (JP); Yoshihiro Mikami, Tokyo (JP)

(73) Assignee: Dyna-Air Co. Ltd., Tokyo (JP)

( * ) Notice: Subject to any disclaimer, the term of this patent is extended or adjusted under 35 U.S.C. 154(b) by 0 days.

(21) Appl. No.: 12/992,690

(22) PCT Filed: May 15, 2009

(86) PCT No.: PCT/JP2009/002149
§ 371 (c)(1),
(2), (4) Date: Jan. 20, 2011

(87) PCT Pub. No.: WO2009/141986
PCT Pub. Date: Nov. 26, 2009

(65) Prior Publication Data
US 2011/0101117 A1    May 5, 2011

(30) Foreign Application Priority Data

May 22, 2008 (JP) ................................. 2008-134813

(51) Int. Cl.
*F25D 17/06* (2006.01)
*F25D 23/00* (2006.01)
*F24F 3/14* (2006.01)
*F02M 23/14* (2006.01)
(52) U.S. Cl. .............. 62/94; 62/271; 236/44 A; 261/153
(58) Field of Classification Search .............. 62/94, 271, 62/332, 335; 236/44 A; 96/8; 95/43, 52; 261/151, 153
See application file for complete search history.

(56) References Cited

U.S. PATENT DOCUMENTS

| | | | |
|---|---|---|---|
| 4,259,849 | A | 4/1981 | Griffiths |
| 6,018,954 | A | 2/2000 | Assaf |
| 6,887,303 | B2 | 5/2005 | Hesse et al. |
| 2004/0112077 | A1 | 6/2004 | Forkosh et al. |

FOREIGN PATENT DOCUMENTS

JP    55-147130 A    11/1980
(Continued)

OTHER PUBLICATIONS

International Search Report for Appl. No. PCT/JP2009/002149.

*Primary Examiner* — Chen Wen Jiang
(74) *Attorney, Agent, or Firm* — Pearne & Gordon LLP

(57) ABSTRACT

A humidity control device (1) comprises: a processor (10) for dehumidifying air; a regenerator (30) for regenerating a hygroscopic liquid L used by the processor (10); a first hygroscopic-liquid pipe path (50) and a second hygroscopic-liquid pipe path (51) for circulating the hygroscopic liquid L between the processor (10) and the regenerator (30); and a heat pump (20) having an evaporator for cooling the hygroscopic liquid L to be used by the processor (10) and a condenser (22) for heating the hygroscopic liquid L flowing through the first hygroscopic-liquid pipe path (50). The regenerator (30) has: a first regeneration processing unit (31) and a second regeneration processing unit (34); a first tank (37) and a second tank (38) for containing the hygroscopic liquid L; and a heat source (44) for heating the hygroscopic liquid L to be supplied to the second regeneration processing unit (34). The hygroscopic liquid L in the first tank (37) is supplied to the first hygroscopic-liquid pipe path (50) to be supplied through the condenser (22) to the first regeneration processing unit (31) again. Consequently, high energy utilization efficiency can be maintained.

3 Claims, 3 Drawing Sheets

FOREIGN PATENT DOCUMENTS

| JP | 61-138039 A | 6/1986 |
| JP | 5-332575 A | 12/1993 |
| JP | 11-504105 A | 4/1999 |
| JP | 3037648 B2 | 4/2000 |
| JP | 3037649 B2 | 4/2000 |
| JP | 2004-523718 A | 8/2004 |
| JP | 2005-214595 A | 8/2005 |
| JP | 2007-253067 A | 10/2007 |
| JP | 2008-111644 A | 5/2008 |

[FIG. 1]
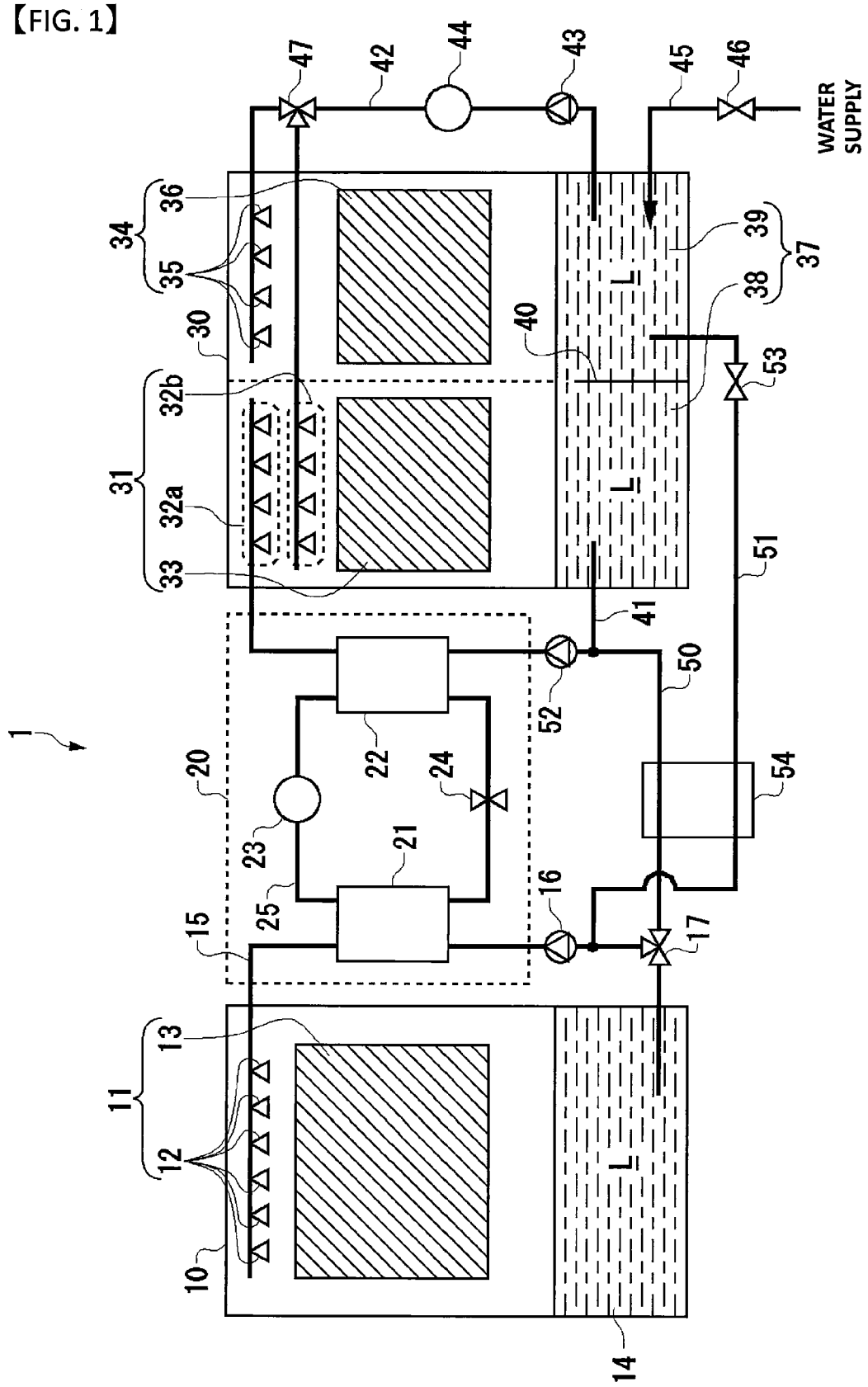

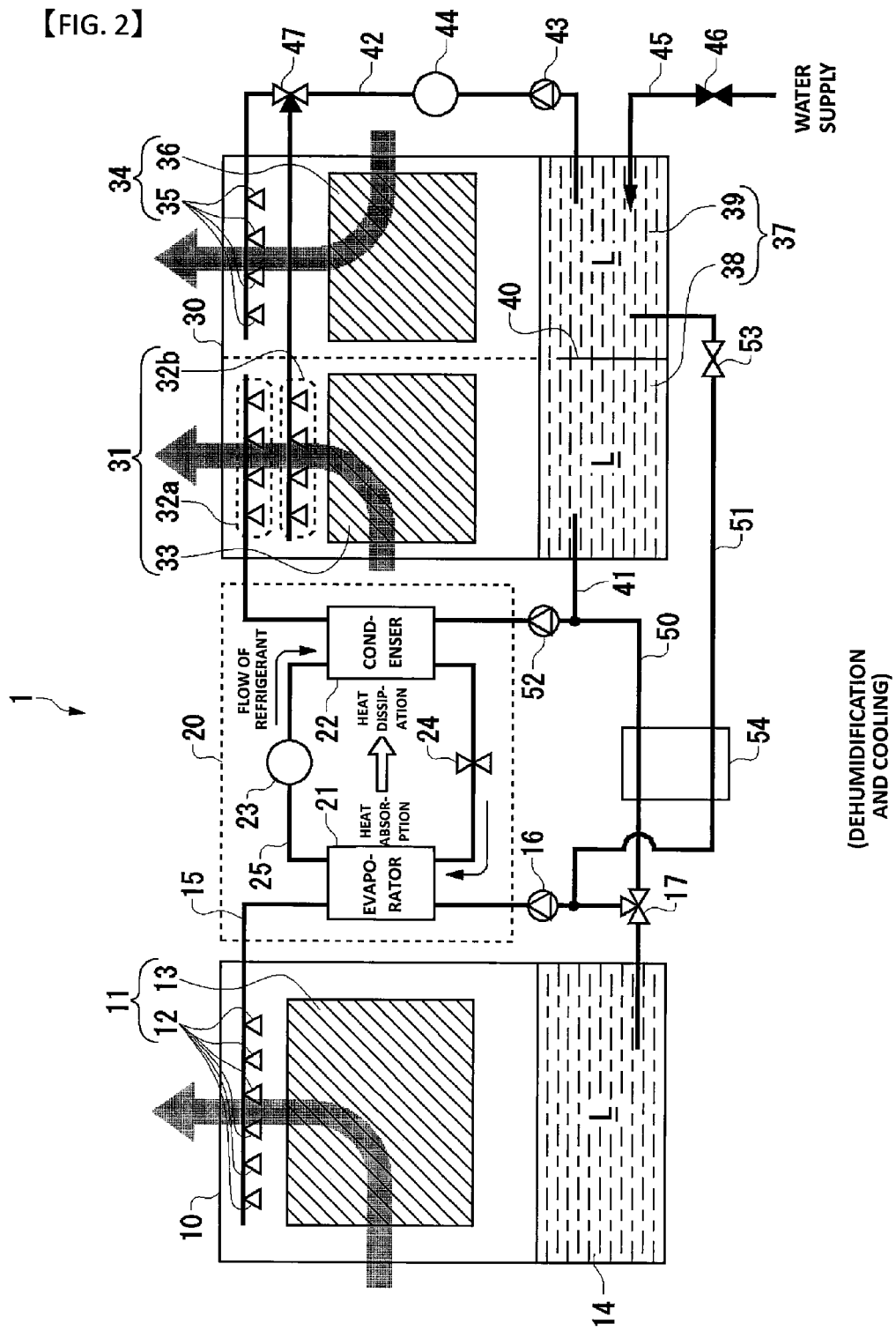
[FIG. 2]
(DEHUMIDIFICATION AND COOLING)

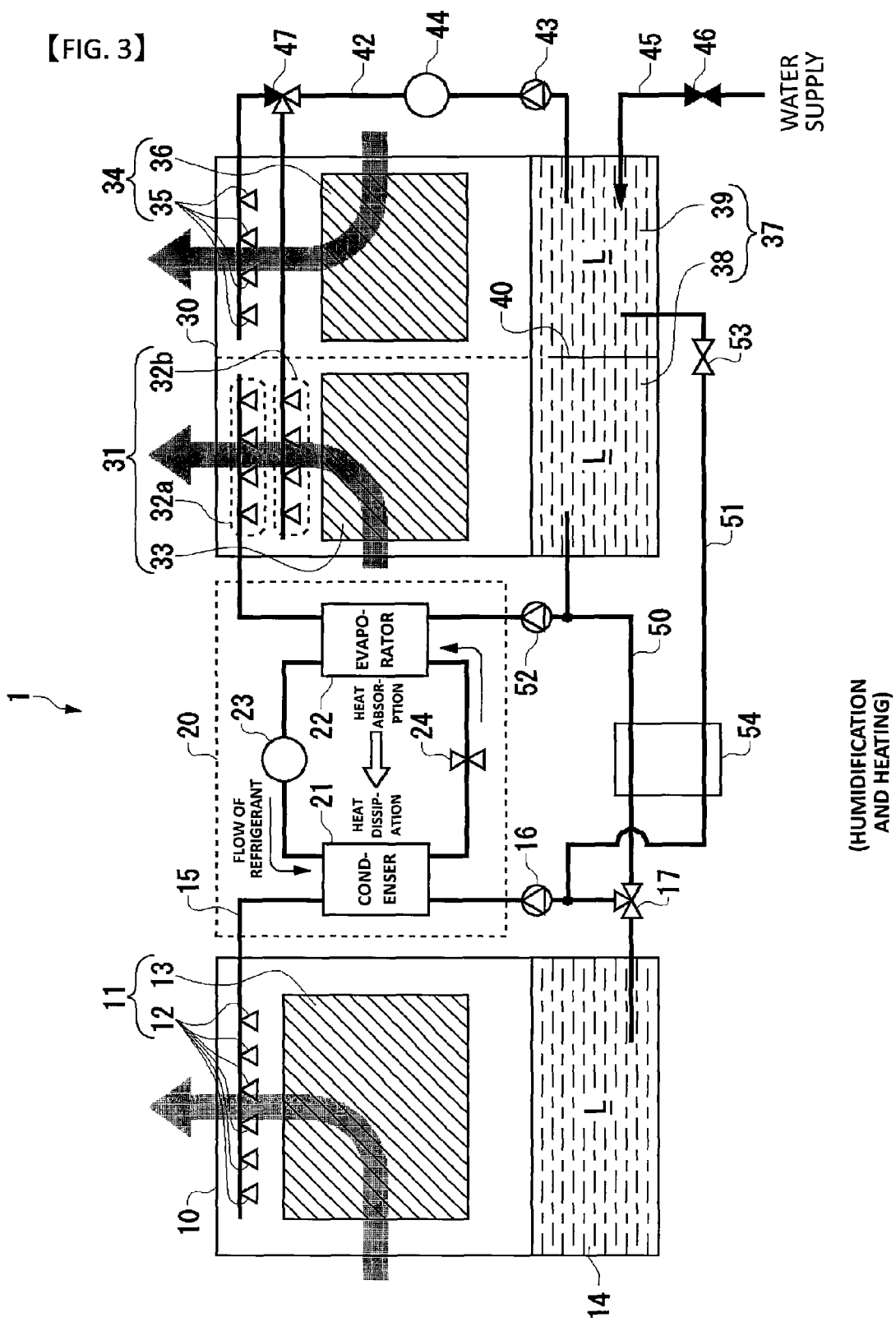

HUMIDITY CONTROL DEVICE

RELATED APPLICATIONS

This application claims the benefit of Japanese Patent Application No. 2008-134813 filed on May 22, 2008 in Japan, the contents of which are incorporated herein by reference.

TECHNICAL FIELD

The present invention relates to a humidity control device that uses a hygroscopic liquid such as lithium chloride (LiCl) to control the humidity.

BACKGROUND ART

Humidity control devices have been conventionally known that use a hygroscopic liquid such as lithium chloride to control the humidity. Such a humidity control device has: a processor for performing a process of taking in air from a target space, dehumidifying or humidifying the taken-in air, and returning the air to the target space; and a regenerator for regenerating the hygroscopic liquid used by the processor.

A hygroscopic liquid of a high solution concentration absorbs moisture as the temperature decreases, and a hygroscopic liquid of a low solution concentration releases moisture as the temperature increases. Taking advantage of this nature, a humidity control device controls the humidity and regenerates a hygroscopic liquid by controlling the temperature of the hygroscopic liquid to be supplied to the processor and regenerator. Here regenerating a hygroscopic liquid means to restore the concentration of the hygroscopic liquid changed due to humidity control to the same condition as before the humidity control. For example, when dehumidification is performed, moisture in air is absorbed by a hygroscopic liquid by cooling the hygroscopic liquid of a high solution concentration and passing air through the cooled hygroscopic liquid. Since this process makes the hygroscopic liquid absorb moisture, the solution concentration of the hygroscopic liquid decreases. Sufficient dehumidification cannot be performed with the hygroscopic liquid of a low solution concentration, and thus the hygroscopic liquid is restored to the hygroscopic liquid of a high solution concentration by desorbing moisture from the hygroscopic liquid. On the other hand, when humidification is performed, the solution concentration of the hygroscopic liquid increases, and thus the hygroscopic liquid is restored to the hygroscopic liquid of a low solution concentration by making the hygroscopic liquid absorb moisture.

The present applicants have suggested a humidity control device that has improved energy utilization efficiency by means of a heat pump (Japanese Patent Laid-Open Application No. 2005-214595). The reason why energy utilization efficiency is improved by using a heat pump is as follows. In the humidity control device, the processor and the regenerator inversely control the temperature of the hygroscopic liquid. When a dehumidification operation is performed, the processor cools the hygroscopic liquid to perform dehumidification and the regenerator heats the hygroscopic liquid to remove moisture therefrom. When a humidification operation is performed, the processor heats the hygroscopic liquid to perform humidification and the regenerator cools the hygroscopic liquid to make it take in moisture. A heat pump is used to utilize heat absorbed from the cooling side (evaporator) for the heating side (condenser) without getting rid of the heat, and therefore energy utilization efficiency can be improved.

The humidity control device using a heat pump described in Japanese Patent Laid-Open Application No. 2005-214595 has a heat source on the regenerator side in addition to the heat pump. This is because if the humidity and regeneration are controlled only by the heat pump, the regeneration process on the regenerator side is restricted by the operating condition of the processor side, and the operation of the processor side sometimes cannot be balanced with that of the regenerator side. In order to prevent such inconvenience, the regenerator is provided with a heat source separate from the heat pump so that the regeneration process can be performed independently of the operating condition of the processor.

SUMMARY OF THE INVENTION

Problems to be Solved by the Invention

It has turned out that the energy utilization efficiency of the humidity control device described in Japanese Patent Laid-Open Application No. 2005-214595 sometimes decreases when it is continuously operated for a long period of time. Here energy utilization efficiency is the ratio of the amount of air that has been dehumidified or humidified to the sum of energy for driving the heat pump and energy applied to the heat source.

Accordingly, a purpose of the invention is to provide a humidity control device capable of maintaining high energy utilization efficiency.

Means for Solving the Problems

A humidity control device of the invention comprises: a processor for dehumidifying air in a target space by cooling a hygroscopic liquid and passing air through the cooled hygroscopic liquid; a regenerator for regenerating the hygroscopic liquid by heating the hygroscopic liquid used by the processor for the dehumidification process and passing air through the heated hygroscopic liquid; a first hygroscopic-liquid pipe path for transferring the hygroscopic liquid from the processor to the regenerator; a second hygroscopic-liquid pipe path for transferring the hygroscopic liquid from the regenerator to the processor; and a heat pump having an evaporator for cooling the hygroscopic liquid to be used by the processor and a condenser for heating the hygroscopic liquid flowing through the first hygroscopic-liquid pipe path, where the regenerator has: a first regeneration processing unit and a second regeneration processing unit for performing a regeneration process on the hygroscopic liquid by passing air therethrough; a first tank and a second tank for containing the hygroscopic liquid; and a heat source for heating the hygroscopic liquid to be supplied to the second regeneration processing unit, where the first regeneration processing unit performs a regeneration process on the hygroscopic liquid supplied through the first hygroscopic-liquid pipe path and puts the regeneration-processed hygroscopic liquid into the first tank, where the hygroscopic liquid in the first tank is supplied to the first hygroscopic-liquid pipe path to be supplied through the condenser to the first regeneration processing unit again and is also supplied to the second tank, where the second regeneration processing unit performs a regeneration process on the hygroscopic liquid supplied from the second tank and puts the regeneration-processed hygroscopic liquid into the second tank, and where the hygroscopic liquid in the second tank is returned through the second hygroscopic-liquid pipe path to the processor.

As a result of keen studies on causes of the decrease in energy utilization efficiency, the inventors have found out that one of the causes is the above-mentioned heat source of the regenerator affecting the temperature difference between the hot and cold sides of the heat pump. That is, since the hygroscopic liquid in the liquid tank of the regenerator is heated by the heat source, the temperature of the hygroscopic liquid increases. The hygroscopic liquid whose temperature has increased enters the condenser, and therefore causes an increase in the temperature difference between the hot and cold sides of the heat pump, deteriorating the efficiency of the heat pump. Based on this finding, the inventors have made the present invention that can appropriately keep the temperature difference between the hot and cold sides of the heat pump.

In the invention, the regenerator is provided with the first and second tanks; the hygroscopic liquid in the second tank is heated by the heat source and is subjected to a regeneration process; and at the same time the non-heated hygroscopic liquid in the first tank is supplied to the first hygroscopic-liquid pipe path, thereby suppressing an increase in the temperature of the hygroscopic liquid entering the condenser of the heat pump. In this way, the temperature difference between the hot and cold sides of the heat pump can be kept appropriately, and high energy utilization efficiency can be maintained.

A humidity control device of another aspect of the invention comprises: a processor for controlling the humidity of air in a target space by passing air through a hygroscopic liquid; a regenerator for regenerating the hygroscopic liquid used by the processor for the humidity control; a first hygroscopic-liquid pipe path for transferring the hygroscopic liquid from the processor to the regenerator; a second hygroscopic-liquid pipe path for transferring the hygroscopic liquid from the regenerator to the processor; and a heat pump having a first heat exchanger for heating or cooling the hygroscopic liquid to be used by the processor and a second heat exchanger for cooling or heating the hygroscopic liquid flowing through the first hygroscopic-liquid pipe path, where the regenerator has: a liquid tank for containing the hygroscopic liquid, the liquid tank partitioned into a first tank and a second tank by a partition which is lower than the liquid level of the hygroscopic liquid; a first regeneration processing unit for performing a regeneration process on the hygroscopic liquid by passing air therethrough and for putting the processed hygroscopic liquid into the first tank; a second regeneration processing unit for performing a regeneration process on the hygroscopic liquid by passing air therethrough and for putting the processed hygroscopic liquid into the second tank; a pipe for returning part of the hygroscopic liquid in the first tank to the upper stream of the second heat exchanger in the first hygroscopic-liquid pipe path; a pipe for supplying part of the hygroscopic liquid in the second tank to the first regeneration processing unit or the second regeneration processing unit; and a heat source for heating the hygroscopic liquid to be supplied from the second tank to the first regeneration processing unit or the second regeneration processing unit, where the second tank is connected to the second hygroscopic-liquid pipe path, where when the processor performs dehumidification, the heat pump is operated with the first heat exchanger as an evaporator and with the second heat exchanger as a condenser and the hygroscopic liquid in the second tank is supplied to the second regeneration processing unit, and where when the processor performs humidification, the heat pump is operated with the first heat exchanger as a condenser and with the second heat exchanger as an evaporator and the hygroscopic liquid in the second tank is supplied to the first regeneration processing unit.

The humidity control device is thus configured to be able to interchange the functions of the first and second heat exchangers, and can thereby perform both dehumidification and humidification. The interchange of the functions between the first and second heat exchangers just requires that the flow of the refrigerant in the heat pump be reversed. Since the liquid tank of the regenerator is partitioned into the first and second tanks, the temperature difference between the hot and cold sides of the heat pump can be kept appropriately and high energy utilization efficiency can be maintained when dehumidification is performed, as in the above-described aspect of the invention. When humidification is performed, the hygroscopic liquid in the second tank is supplied to the first regeneration processing unit and enters the first tank, and therefore the hygroscopic liquid heated by the heat source can be returned from the first tank to the second heat exchanger. Consequently, the temperature difference between the hot and cold sides of the heat pump can be kept appropriately when the second heat exchanger functions as an evaporator, and high energy utilization efficiency can be maintained. Since the first and second tanks are partitioned by the partition which is lower than the liquid level of the hygroscopic liquid, the hygroscopic liquid easily flows from the first tank to the second tank. The height of the liquid level is determined by the amount of the hygroscopic liquid used in the humidity control device. The humidity control device controls the amount of the circulating hygroscopic liquid so as to maintain the liquid level constant during operation. While the height of the partition can be designed as appropriate, it should be high enough not to cause the temperatures of the hygroscopic liquid in the first tank and that in the second tank to even out. Specifically, the height of the partition is preferably 70% to 95% of the height of the liquid level, more preferably 75% to 90% of the height of the liquid level, and most preferably 80% to 85% of the height of the liquid level.

In the above-described humidity control device, the regenerator may have a water supply unit for supplying water to the second tank, and the water supply unit may supply water to the second tank when the processor performs humidification.

The second tank contains a relatively large amount of the hygroscopic liquid, and therefore the configuration to supply water to the liquid tank can prevent a rapid decrease in the temperature of the hygroscopic liquid. In addition, since heat of absorption is generated when the hygroscopic liquid absorbs water, the temperature of the hygroscopic liquid increases as the hygroscopic liquid absorbs water even when the temperature of the hygroscopic liquid has decreased due to the water supply. Thus preventing a rapid decrease in the temperature of the hygroscopic liquid in the second tank leads to suppression of a decrease in the temperature of the hygroscopic liquid that is returned through the second hygroscopic-liquid pipe path to the processor side and is supplied to the condenser of the heat pump. Consequently, the temperature of the hygroscopic liquid used in the processor can be kept to perform humidification appropriately, and high energy utilization efficiency can be kept.

A humidity control device of another aspect of the invention comprises: a processor for humidifying air by heating a hygroscopic liquid and passing air through the heated hygroscopic liquid; a regenerator for regenerating the hygroscopic liquid used by the processor for the humidification process; a first hygroscopic-liquid pipe path for transferring the hygroscopic liquid from the processor to the regenerator; a second hygroscopic-liquid pipe path for transferring the hygroscopic liquid from the regenerator to the processor; and a heat pump having a condenser for heating the hygroscopic liquid to be used by the processor and an evaporator for cooling the hygroscopic liquid flowing through the first hygroscopic-liquid pipe path, where the regenerator has: a regeneration processing unit for performing a regeneration process on the hygroscopic liquid supplied through the first hygroscopic-liquid pipe path by passing air through the hygroscopic liquid; a liquid tank for containing the hygroscopic liquid regeneration-processed by the regeneration processing unit; a heat source for heating the hygroscopic liquid in the liquid tank; and a water supply unit for supplying water to the tank, and where the hygroscopic liquid in the liquid tank is supplied to the first hygroscopic-liquid pipe path to be supplied through the condenser to the regeneration processing unit again and is returned through the second hygroscopic-liquid pipe path to the processor.

The configuration to supply water to the liquid tank allows the supplied water to be mixed with a relatively large amount of the hygroscopic liquid in the liquid tank, and therefore can prevent a rapid decrease in the temperature of the hygroscopic liquid. In addition, since heat of absorption is generated when the hygroscopic liquid absorbs water, the temperature of the hygroscopic liquid increases as the hygroscopic liquid absorbs water even when the temperature of the hygroscopic liquid has decreased due to the water supply. Thus preventing a rapid decrease in the temperature of the hygroscopic liquid in the liquid tank leads to suppression of a decrease in the temperature of the hygroscopic liquid that is returned through the second hygroscopic-liquid pipe path to the processor side and is supplied to the condenser of the heat pump. Consequently, the temperature of the hygroscopic liquid used in the processor can be kept to perform humidification appropriately, and high energy utilization efficiency can be kept.

In the above-described humidity control device, the regenerator may have a heat source for heating the hygroscopic liquid in the liquid tank.

This configuration allows the temperature of the hygroscopic liquid in the liquid tank to be controlled, and allows the temperature of the hygroscopic liquid supplied from the regenerator to the condenser of the heat pump to be controlled.

There are other aspects of the invention as described below. This disclosure of the invention therefore intends to provide part of the aspects of the invention and does not intend to limit the scope of the invention described and claimed herein.

BRIEF DESCRIPTION OF THE DRAWINGS

FIG. 1 shows a configuration of a humidity control device of an embodiment;

FIG. 2 shows an operation of the humidity control device of the embodiment performing dehumidification; and FIG. 3 shows an operation of the humidity control device of the embodiment performing humidification.

MODE OF EMBODYING THE INVENTION

A humidity control device of an embodiment of the invention will be described below with reference to the drawings. The embodiments described below are only examples of the invention, and the invention can be varied in various aspects. Therefore, the specific configurations and functions disclosed below do not limit the claims.

FIG. 1 shows a configuration of a humidity control device 1 of an embodiment. The humidity control device 1 has: a processor 10 for controlling humidity by taking in air from a target space (the inside of a room) or the outside of a room and passing the taken-in air through a hygroscopic liquid L; a heat pump 20 for controlling the temperature of the hygroscopic liquid L in order for the processor 10 to perform the humidity control process; and a regenerator 30 for regenerating the hygroscopic liquid L used for the humidity control process in the processor 10. Lithium chloride (LiCl) is used as the hygroscopic liquid L in the embodiment. Not only lithium chloride, but also a solution of a deliquescent salt such as a saline solution, a highly hygroscopic polyol such as glycerol, ethylene glycol, and propylene glycol, or other inexpensive hygroscopic liquid may be used as the hygroscopic liquid.

The processor 10 is indoor equipment for controlling the humidity of air in a room, and the regenerator 30 is outdoor equipment for regenerating the hygroscopic liquid L by giving and receiving moisture to and from outside air. While FIG. 1 shows an example where one regenerator 30 is connected to one processor 10, the device may be configured so that one regenerator 30 is connected to a plurality of processors 10. For example, in a case where the humidity control device 1 is installed in an apartment house, a big supermarket, or the like, the device can be configured so that the processor 10 is installed in each room or on each floor and one regenerator 30 connected to the processors 10 is installed on the outside.

The processor 10 and the regenerator 30 are connected to each other by a first hygroscopic-liquid pipe path 50 and a second hygroscopic-liquid pipe path 51. The first hygroscopic-liquid pipe path 50 is a pipe path for transferring the hygroscopic liquid L from the processor 10 to the regenerator 30, and the second hygroscopic-liquid pipe path 51 is a pipe path for transferring the hygroscopic liquid L from the regenerator 30 to the processor 10. The hygroscopic liquid L is circulated between the processor 10 and the regenerator 30 through the first hygroscopic-liquid pipe path 50 and second hygroscopic-liquid pipe path 51, and this allows the hygroscopic liquid L used by the processor 10 to be regenerated by the regenerator 30 and be returned to the processor 10.

The processor 10 has an air processing unit 11 for performing a humidity control process by passing air through the hygroscopic liquid L, and a liquid tank 14 for containing the hygroscopic liquid L. The air processing unit 11 comprises a plurality of nozzles 12 for spraying the hygroscopic liquid L downward, and a filler 13 provided between the nozzles 12 and the liquid tank 14. The filler 13 is provided for the purpose of increasing contact area between the hygroscopic liquid L and air, and also of preventing the hygroscopic liquid L from splashing. A hydrophilic filtering medium, or a heat transfer fin made of copper, aluminum, or stainless steel may be used as the filler. While an example in which the hygroscopic liquid L is sprayed by means of the nozzles 12 is described in the embodiment, a configuration in which the hygroscopic liquid L is dropped on the filler 13 may be adopted.

The processor 10 has a pipe 15 for supplying the hygroscopic liquid L present in the liquid tank 14 to the plurality of nozzles 12. A pump 16 is attached to the pipe 15, and the pump 16 sucks up the hygroscopic liquid L present in the liquid tank 14. The pipe 15 is also provided with a first heat exchanger 21 of the heat pump 20, and the first heat exchanger 21 heats or cools the hygroscopic liquid L. Whether the hygroscopic liquid L is heated or cooled depends on whether the processor 10 performs humidification or dehumidification. That is, when the processor 10 performs humidification, the hygroscopic liquid L is heated in order to make moisture contained in the hygroscopic liquid L be desorbed and taken in by air. On the other hand, when the processor 10 performs dehumidification, the hygroscopic liquid L is cooled in order to facilitate the absorption of moisture in air into the hygroscopic liquid L.

The first hygroscopic-liquid pipe path 50 for transferring the hygroscopic liquid L present in the liquid tank 14 to the regenerator 30 is connected via a three-way valve 17 to the pipe 15 for sucking up the hygroscopic liquid L from the liquid tank 14. The three-way valve 17 controls the amount of the hygroscopic liquid L to be transferred to the air processing unit 11 of the processor 10 and the amount of the hygroscopic liquid L to be transferred through the first hygroscopic-liquid pipe path 50 to the regenerator 30. In the embodiment, the three-way valve 17 controls so that (the amount of the hygroscopic liquid L to be transferred to the air processing unit 11):(the amount of the hygroscopic liquid L to be transferred to the regenerator 30) will be a ratio between 8:2 and 9:1.

A second heat exchanger 22 of the heat pump 20 is provided in the first hygroscopic-liquid pipe path 50, and cools or heats the hygroscopic liquid L to be supplied to the regenerator 30. Here a configuration of the heat pump 20 will be described. The heat pump 20 comprises the first heat exchanger 21, the second heat exchanger 22, a compressor 23, an expansion valve 24, and a refrigerant pipe 25 for connecting them to one another. The heat pump 20 can make the first heat exchanger 21 function as an evaporator or as a condenser by reversing the flow of the refrigerant. The second heat exchanger 22 performs an inverse process of the first heat exchanger 21.

The regenerator 30 will next be described. The regenerator 30 has a first regeneration processing unit 31 and second regeneration processing unit 34 for performing a regeneration process on the hygroscopic liquid L by passing air therethrough, and a liquid tank 37 for containing the hygroscopic liquid L. The first regeneration processing unit 31 comprises pluralities of nozzles 32a and 32b for spraying the hygroscopic liquid L downward, and a filler 33 provided below the nozzles 32a and 32b. Similarly, the second regeneration processing unit 34 comprises a plurality of nozzles 35 for spraying the hygroscopic liquid L downward, and a filler 36 provided below the nozzles 35. While an example in which the hygroscopic liquid L is sprayed by means of the nozzles 32a and 32b is described in the embodiment, a configuration in which the hygroscopic liquid L is dropped on the filler 33 may be adopted.

The liquid tank 37 of the regenerator 30 is partitioned by a partition 40 which is lower than the liquid level of the hygroscopic liquid L, so that a first tank 38 and a second tank 39 are formed. The height of the partition 40 can be designed as appropriate, and in the embodiment is 80% of the height of the liquid level. The second tank 39 is connected with the second hygroscopic-liquid pipe path 51, and the hygroscopic liquid L regenerated by the regenerator 30 is returned from the second tank 39 to the processor 10.

The first regeneration processing unit 31 performs a regeneration process on the hygroscopic liquid L by spraying downward from the nozzles 32a the hygroscopic liquid L supplied from the first hygroscopic-liquid pipe path 50. The hygroscopic liquid L regeneration-processed by the first regeneration processing unit 31 enters the first tank 38. The first tank 38 is connected via a pipe 41 to the first hygroscopic-liquid pipe path 50. Part of the hygroscopic liquid L in the first tank 38 is supplied through the pipe 41 to the first hygroscopic-liquid pipe path 50, and is supplied through the second heat exchanger 22 to the first regeneration processing unit 31 again. With such circulation of the hygroscopic liquid L present in the first tank 38, the first regeneration processing unit 31 repeatedly performs the regeneration process on the hygroscopic liquid L.

Since the partition 40 between the first tank 38 and the second tank 39 is lower than the liquid level, the hygroscopic liquid L in the first tank 38 flows into the second tank 39 as the hygroscopic liquid L supplied from the processor 10 enters the first tank 38.

The regenerator 30 has a pipe 42 for supplying the hygroscopic liquid L present in the second tank 39 to the nozzles 32b or nozzles 35. The regenerator 30 can control a supply destination of the hygroscopic liquid L by means of a three-way valve 47 provided on the pipe 42. The three-way valve 47 may be switched so that the hygroscopic liquid L may be supplied to either one of the nozzles 32b or nozzles 35, or the amounts of the hygroscopic liquid L to be supplied from the three-way valve 47 to the nozzles 32b and nozzles 35 may be made to differ. In the embodiment, the three-way valve 47 supplies the hygroscopic liquid L to the nozzles 35 during dehumidification operation, and supplies the hygroscopic liquid L to the nozzles 32b during humidification operation.

A pump 43 is attached to the pipe 42, and it sucks up the hygroscopic liquid L present in the second tank 39. A heat source 44 is attached to this pipe 42, and it heats the hygroscopic liquid L sucked up from the second tank 39. The second regeneration processing unit 34 performs a regeneration process on the hygroscopic liquid L sucked up from the second tank 39. The hygroscopic liquid L regeneration-processed by the second regeneration processing unit 34 enters the second tank 39 again.

The regenerator 30 has a water supply pipe 45 for supplying water to the second tank 39. The water supply pipe 45 is provided with a valve 46, which controls the water supply.

The hygroscopic liquid L in the second tank 39 returns through the second hygroscopic-liquid pipe path 51 to the processor 10. The amount of the hygroscopic liquid L to return from the regenerator 30 to the processor 10 is controlled by a valve 53. In the embodiment, the valve 53 controls the amount of the hygroscopic liquid L to be returned to the processor 10 so as to make the height of the liquid level of the hygroscopic liquid L in the liquid tank 37 be constant.

The humidity control device 1 has a heat exchanger 54 for exchanging heat between the first hygroscopic-liquid pipe path 50 and the second hygroscopic-liquid pipe path 51. This heat exchanger 54 reduces the temperature difference between the hygroscopic liquid L flowing through the first hygroscopic-liquid pipe path 50 and the hygroscopic liquid L flowing through the second hygroscopic-liquid pipe path 51, and contributes to reducing the temperature difference between the hot and cold sides of the heat pump 20.

FIG. 2 shows a dehumidification operation performed by the humidity control device 1 of the embodiment. When the humidity control device 1 performs dehumidification, the heat pump 20 is made to function with the first heat exchanger 21 as an evaporator and with the second heat exchanger 22 as a condenser. The hygroscopic liquid L of a high solution concentration is put in the liquid tank 14 of the processor 10.

The processor 10 sucks up the hygroscopic liquid L of a high solution concentration from the liquid tank 14, cools the hygroscopic liquid L by means of the evaporator 21, and then supplies it to the air processing unit 11. The air processing unit 11 sprays the hygroscopic liquid L downward from the plurality of nozzles 12. The sprayed hygroscopic liquid L returns through the filler 13 to the liquid tank 14.

At the same time as the above-described operation, the processor 10 takes in air from a target space or the outside thereof by means of a not shown fan, passes the air through the filler 13, and then discharges it into the target space. Since the hygroscopic liquid L of a high solution concentration and of a low temperature exists in the filler 13, moisture in air is absorbed by the hygroscopic liquid L, so that the discharged air is dehumidified. At the same time, heat exchange is also performed between the hygroscopic liquid L and the air, so that the discharged air is cooled.

When the processor 10 continuously performs the dehumidification operation, the hygroscopic liquid L is diluted and it becomes difficult for the hygroscopic liquid L to absorb moisture in air. This is why the hygroscopic liquid L is regenerated by the regenerator 30. In the humidity control device 1, part of the hygroscopic liquid L sucked out from the liquid tank 14 of the processor 10 is supplied to the first hygroscopic-liquid pipe path 50, and is transferred to the regenerator 30. The amount of the hygroscopic liquid L to be transferred to the regenerator 30 is controlled by the three-way valve 17.

The condenser 22 is provided in the middle of the first hygroscopic-liquid pipe path 50, and the hygroscopic liquid L to be transferred to the regenerator 30 is heated by the condenser 22. The regenerator 30 performs a regeneration process, by means of the first regeneration processing unit 31, on the hygroscopic liquid L which is supplied from the first hygroscopic-liquid pipe path 50 and whose solution concentration has decreased. Specifically, the first regeneration processing unit 31 sprays the hygroscopic liquid L heated by the condenser 22 downward from the nozzles 32a. The sprayed hygroscopic liquid L enters the first tank 38 through the filler 33.

At the same time as the above-described operation, the regenerator 30 takes in outside air by means of a not shown fan, and passes the air through the filler 33. Consequently, moisture is desorbed from the high-temperature hygroscopic liquid L existing in the filler 33 and containing much moisture and escapes into the air, so that the concentration of the hygroscopic liquid L increases. The hygroscopic liquid L processed by the first regeneration processing unit 31 enters the first tank 38.

The hygroscopic liquid L that has entered the first tank 38 is supplied to the first hygroscopic-liquid pipe path 50, and also flows to the second tank 39. The hygroscopic liquid L supplied to the first hygroscopic-liquid pipe path 50 is heated by the condenser 22, and is supplied to the first regeneration processing unit 31 again. Such circulation of the hygroscopic liquid L between the first regeneration processing unit 31 and the first tank 38 allows the concentration of the hygroscopic liquid L to increase gradually.

The regenerator 30 sucks up the hygroscopic liquid L present in the second tank 39. When dehumidification is performed, the three-way valve 47 opens the flow path to the nozzles 35 and closes the flow path to the nozzles 32b. Consequently, the hygroscopic liquid L heated by the heat source 44 is supplied to the second regeneration processing unit 34. The second regeneration processing unit 34 sprays the hygroscopic liquid L downward from the plurality of nozzles 35.

As described above, since the regenerator 30 takes in air and passes it through the filler 36, moisture is desorbed from the high-temperature hygroscopic liquid L existing in the filler 36 and containing much moisture and escapes into the air, so that the concentration of the hygroscopic liquid L increases. The sprayed hygroscopic liquid L returns through the filler 36 to the second tank 39.

The temperature of the hygroscopic liquid L to be sprayed in the second regeneration processing unit 34 is raised by the heat source 44 and is higher than the temperature of the hygroscopic liquid L in the first regeneration processing unit 31. Accordingly, the hygroscopic liquid L sprayed from the nozzles 35 of the second regeneration processing unit 34 is in a state where moisture is more easily desorbed as compared to the hygroscopic liquid L sprayed from the nozzles 32a of the first regeneration processing unit 31, and the process of regenerating the hygroscopic liquid L advances further. The circulation of the hygroscopic liquid L between the second regeneration processing unit 34 and the second tank 39 allows the concentration of the hygroscopic liquid L to increase gradually, regenerating the hygroscopic liquid L.

The regeneration-processed hygroscopic liquid L in the second tank 39 returns through the second hygroscopic-liquid pipe path 51 to the processor 10. The hygroscopic liquid L on the way back to the processor 10 decreases in temperature by heat exchange performed by the heat exchanger 54 with the hygroscopic liquid L flowing toward the regenerator 30. The above is a description of the dehumidification operation of the humidity control device 1 of the embodiment.

The humidity control device 1 of the embodiment adopts the configuration in which: the liquid tank 37 of the regenerator 30 is separated into the first tank 38 and the second tank 39 by the partition 40; and the heat source 44 is used for the process of regenerating the hygroscopic liquid L present in the second tank 39, but is not used for the process of regenerating the hygroscopic liquid L present in the first tank 38. This can suppress an increase in the temperature of the hygroscopic liquid L present in the first tank 38, suppressing an increase in the temperature of the hygroscopic liquid L supplied from the first tank 38 through the first hygroscopic-liquid pipe path 50 to the condenser 22, so that the temperature difference between the hot and cold sides of the heat pump 20 can be prevented from becoming large. In addition to the function of heating the hygroscopic liquid L passing through the first hygroscopic-liquid pipe path 50 in order to perform the regeneration process (dehydration) on the hygroscopic liquid L, the condenser 22 of the heat pump 20 has a function of dissipating heat absorbed in the evaporator 21. An increase in the temperature of the hygroscopic liquid L passing through the first hygroscopic-liquid pipe path 50 would cause an increase in the energy required for the heat dissipation of the heat pump 20, reducing energy utilization efficiency. The humidity control device 1 of the embodiment adopts the scheme for suppressing an increase in the temperature of the hygroscopic liquid L passing through the first hygroscopic-liquid pipe path 50 as described above, and therefore high energy utilization efficiency can be maintained even when the humidity control device 1 is continuously used.

FIG. 3 shows a humidification operation performed by the humidity control device 1 of the embodiment. When the humidity control device 1 performs humidification, the heat pump 20 is made to function with the first heat exchanger 21 as a condenser and with the second heat exchanger 22 as an evaporator. The hygroscopic liquid L of a low solution concentration (containing much moisture) is put in the liquid tank of the processor 10. Basically, the humidification operation simply requires the opposite of the dehumidification operation.

The processor 10 heats the hygroscopic liquid L of a low solution concentration and passes it through the filler 13, thereby desorbing moisture from the hygroscopic liquid L to humidify air. At the same time, heat exchange is also performed between the hygroscopic liquid L and the air, so that the discharged air is heated.

When the processor 10 continuously performs the humidification operation, the hygroscopic liquid L is concentrated and moisture released to air decreases. This is why the hygroscopic liquid L is regenerated by the regenerator 30. In the humidity control device 1, part of the hygroscopic liquid L sucked out from the liquid tank 14 of the processor 10 is supplied to the first hygroscopic-liquid pipe path 50, and is transferred to the regenerator 30.

The evaporator 22 is provided in the middle of the first hygroscopic-liquid pipe path 50, and the hygroscopic liquid L to be transferred to the regenerator 30 is cooled by the evaporator 22. The first regeneration processing unit 31 of the regenerator 30 passes the cooled high-concentration hygroscopic liquid L through the filler, thereby performing a regeneration process to make the hygroscopic liquid L absorb moisture, and puts the processed hygroscopic liquid L into the first tank 38.

The hygroscopic liquid L that has entered the first tank 38 is supplied to the first hygroscopic-liquid pipe path 50, and also flows to the second tank 39. The hygroscopic liquid L supplied to the first hygroscopic-liquid pipe path 50 is cooled by the evaporator 22, and is supplied to the first regeneration processing unit 31 again. Such circulation of the hygroscopic liquid L between the first regeneration processing unit 31 and the first tank 38 allows the concentration of the hygroscopic liquid L to decrease gradually.

The regenerator 30 sucks up the hygroscopic liquid L present in the second tank 39. When humidification is performed, the three-way valve 47 opens the flow path to the nozzles 32b and closes the flow path to the nozzles 35. Consequently, the hygroscopic liquid L sucked up from the second tank 39 and heated by the heat source 44 is supplied to the first regeneration processing unit 31.

Since outside air is dry when the humidification operation is performed, the hygroscopic liquid L is regenerated (diluted) by directly supplying water to the hygroscopic liquid L in addition to taking moisture from outside air into the hygroscopic liquid L. The regenerator 30 opens the valve 46 of the water supply pipe 45 to supply water to the second tank 39. The regenerator 30 also heats the hygroscopic liquid L by means of the heat source 44 if the water supply reduces the temperature of the hygroscopic liquid L. The regeneration-processed hygroscopic liquid L present in the second tank 39 returns through the second hygroscopic-liquid pipe path 51 to the processor 10. The above is a description of the humidification operation of the humidity control device 1 of the embodiment.

Since the humidity control device 1 of the embodiment supplies water to the second tank 39, the supplied water is mixed with a relatively large amount of the hygroscopic liquid L in the second tank 39, and a rapid decrease in the temperature of the hygroscopic liquid L due to the water supply can be prevented. In addition, since heat of absorption is generated when the hygroscopic liquid L absorbs water, the temperature of the hygroscopic liquid L increases as the hygroscopic liquid L absorbs water even when the temperature of the hygroscopic liquid L has decreased due to the water supply. While the hygroscopic liquid L in the second tank 39 is returned through the second hygroscopic-liquid pipe path 51 to the processor 10 and is supplied to the condenser 21 of the heat pump 20, the configuration of the embodiment preventing a rapid decrease in the temperature of the hygroscopic liquid L in the second tank 39 can prevent a rapid decrease in the temperature of the hygroscopic liquid supplied to the condenser 21. Consequently, the temperature of the hygroscopic liquid used in the processor 10 can be kept to perform humidification appropriately, and high energy utilization efficiency can be kept.

Conventionally a configuration has been known in which water is supplied on the second hygroscopic-liquid pipe path 51 that returns the hygroscopic liquid L from the regenerator 30 to the processor 10. However, the amount of the hygroscopic liquid L flowing through the second hygroscopic-liquid pipe path 51 is significantly less than the amount of the hygroscopic liquid L in the second tank 39, and therefore the hygroscopic liquid L would be easily affected by the temperature of the supplied water. Particularly in cold regions, the temperature of water supplied in winter when the humidification operation is performed is extremely low, thereby causing the temperature of the hygroscopic liquid L flowing through the second hygroscopic-liquid pipe path 51 to decrease rapidly, and the hygroscopic liquid L in that condition is supplied to the condenser 21 of the heat pump 20. For this reason, the hygroscopic liquid L would not be able to be sufficiently heated by the condenser 21. As a result, the not sufficiently heated hygroscopic liquid L would be sprayed from the nozzles 12, an appropriate humidification would not be able to be performed, and energy utilization efficiency would decrease. The humidity control device 1 of the embodiment can solve such conventional problems.

When performing humidification, the humidity control device 1 of the embodiment supplies the hygroscopic liquid L sucked up from the second tank 39 to the first regeneration processing unit 31, and puts the processed hygroscopic liquid L into the first tank 38. Consequently, the hygroscopic liquid L which is heated by the heat source 44 and whose temperature is increased by heat of absorption enters the first tank 38, and is supplied from the first tank 38 through the pipe 41 to the evaporator 22. The supply of the high-temperature hygroscopic liquid L to the evaporator 22 facilitates the heat absorption by the evaporator 22, and can improve the energy utilization efficiency of the heat pump 20.

While a humidity control device of the invention has been described in detail above with an embodiment, the invention is not limited to the above-described embodiment.

While in the above-described embodiment the humidity control device 1 capable of performing both dehumidification and humidification has been described as an example, the invention can be applied to a humidity control device that only performs dehumidification or humidification. A humidity control device that exclusively performs dehumidification need not be provided with the water supply pipe 45 described in the above embodiment. If a humidity control device exclusively performs humidification, the liquid tank 37 need not be separated, but may also be a single liquid tank, in the configuration of the regenerator 30.

While in the above-described embodiment the first tank 38 and the second tank 39 are formed by partitioning the liquid tank 37 with the partition 40, the first tank 38 and the second tank 39 may be configured to be independent and separate tanks. In this case, the first tank 38 and the second tank 39 may be configured so that the hygroscopic liquid L can move between the first tank 38 and the second tank 39 in an amount that does not cause the temperatures of the hygroscopic liquid L in the first tank 38 and that in the second tank 39 to even out easily, or so that the hygroscopic liquid L may flow only from the first tank 38 to the second tank 39. The configuration in which the hygroscopic liquid L flows only from the first tank 38 to the second tank 39 can be realized, for example, by inclining a pipe connecting both tanks 38 and 39 to each other toward the second tank 39.

While there have been described what are at present considered to be preferred embodiments of the invention, it will be understood that various modifications and variations may be made thereto, and it is intended that appended claims cover all such modifications and variations as fall within the true spirit and scope of the invention.

INDUSTRIAL APPLICABILITY

The invention has advantages of being able to keep the temperature difference between the hot and cold sides of the heat pump appropriately and maintain high energy utilization efficiency, and is useful as a humidity control device that uses a hygroscopic liquid to control the humidity, or the like.

The invention claimed is:

1. A humidity control device comprising:
a processor for dehumidifying air in a target space by cooling a hygroscopic liquid and passing air through the cooled hygroscopic liquid;
a regenerator for regenerating the hygroscopic liquid by heating the hygroscopic liquid used by the processor for the dehumidification process and passing air through the heated hygroscopic liquid;
a first hygroscopic-liquid pipe path for transferring the hygroscopic liquid from the processor to the regenerator;
a second hygroscopic-liquid pipe path for transferring the hygroscopic liquid from the regenerator to the processor; and
a heat pump having an evaporator for cooling the hygroscopic liquid to be used by the processor and a condenser for heating the hygroscopic liquid flowing through the first hygroscopic-liquid pipe path,
wherein the regenerator has:
a first regeneration processing unit and a second regeneration processing unit for performing a regeneration process on the hygroscopic liquid by passing air therethrough;
a first tank and a second tank for containing the hygroscopic liquid; and
a heat source for heating the hygroscopic liquid to be supplied to the second regeneration processing unit,
wherein the first regeneration processing unit performs a regeneration process on the hygroscopic liquid supplied through the first hygroscopic-liquid pipe path and puts the regeneration-processed hygroscopic liquid into the first tank,
wherein the hygroscopic liquid in the first tank is supplied to the first hygroscopic-liquid pipe path to be supplied through the condenser to the first regeneration processing unit again and is also supplied to the second tank,
wherein the second regeneration processing unit performs a regeneration process on the hygroscopic liquid supplied from the second tank and puts the regeneration-processed hygroscopic liquid into the second tank, and
wherein the hygroscopic liquid in the second tank is returned through the second hygroscopic-liquid pipe path to the processor.

2. A humidity control device comprising:
a processor for controlling the humidity of air in a target space by passing air through a hygroscopic liquid;
a regenerator for regenerating the hygroscopic liquid used by the processor for the humidity control;
a first hygroscopic-liquid pipe path for transferring the hygroscopic liquid from the processor to the regenerator;
a second hygroscopic-liquid pipe path for transferring the hygroscopic liquid from the regenerator to the processor; and
a heat pump having a first heat exchanger for heating or cooling the hygroscopic liquid to be used by the processor and a second heat exchanger for cooling or heating the hygroscopic liquid flowing through the first hygroscopic-liquid pipe path, wherein the regenerator has:
a liquid tank for containing the hygroscopic liquid, the liquid tank partitioned into a first tank and a second tank by a partition which is lower than the liquid level of the hygroscopic liquid;
a first regeneration processing unit for performing a regeneration process on the hygroscopic liquid by passing air therethrough and for putting the processed hygroscopic liquid into the first tank;
a second regeneration processing unit for performing a regeneration process on the hygroscopic liquid by passing air therethrough and for putting the processed hygroscopic liquid into the second tank;
a pipe for returning part of the hygroscopic liquid in the first tank to the upper stream of the second heat exchanger in the first hygroscopic-liquid pipe path;
a pipe for supplying part of the hygroscopic liquid in the second tank to the first regeneration processing unit or the second regeneration processing unit; and
a heat source for heating the hygroscopic liquid to be supplied from the second tank to the first regeneration processing unit or the second regeneration processing unit,
wherein the second tank is connected to the second hygroscopic-liquid pipe path,
wherein when the processor performs dehumidification, the heat pump is operated with the first heat exchanger as an evaporator and with the second heat exchanger as a condenser and the hygroscopic liquid in the second tank is supplied to the second regeneration processing unit, and
wherein when the processor performs humidification, the heat pump is operated with the first heat exchanger as a condenser and with the second heat exchanger as an evaporator and the hygroscopic liquid in the second tank is supplied to the first regeneration processing unit.

3. The humidity control device according to claim 2,
wherein the regenerator has a water supply unit for supplying water to the second tank, and
wherein the water supply unit supplies water to the second tank when the processor performs humidification.

* * * * *